United States Patent
Zimmer

(10) Patent No.: US 10,309,261 B2
(45) Date of Patent: Jun. 4, 2019

(54) METHOD FOR COUPLING A STEAM TURBINE AND A GAS TURBINE AT A DESIRED DIFFERENTIAL ANGLE

(71) Applicant: Siemens Aktiengesellschaft, Munich (DE)

(72) Inventor: Gerta Zimmer, Mulheim an der Ruhr (DE)

(73) Assignee: Siemens Aktiengesellschaft, Munich (DE)

(*) Notice: Subject to any disclaimer, the term of this patent is extended or adjusted under 35 U.S.C. 154(b) by 461 days.

(21) Appl. No.: 14/896,377

(22) PCT Filed: Jun. 6, 2014

(86) PCT No.: PCT/EP2014/061794
§ 371 (c)(1),
(2) Date: Dec. 5, 2015

(87) PCT Pub. No.: WO2014/198649
PCT Pub. Date: Dec. 18, 2014

(65) Prior Publication Data
US 2016/0130983 A1    May 12, 2016

(30) Foreign Application Priority Data

Jun. 14, 2013   (EP) .................................... 13171947

(51) Int. Cl.
*F16D 48/06*    (2006.01)
*F01K 23/16*    (2006.01)
(Continued)

(52) U.S. Cl.
CPC .............. *F01K 23/16* (2013.01); *F01D 19/00* (2013.01); *F02C 7/26* (2013.01); *F16D 48/00* (2013.01);
(Continued)

(58) Field of Classification Search
None
See application file for complete search history.

(56) References Cited

U.S. PATENT DOCUMENTS 3,915,271 A * 10/1975 Harper .................. B63H 23/18
192/103 R
5,109,969 A    5/1992 Blaser
(Continued)

FOREIGN PATENT DOCUMENTS

CN    1464947 A    12/2003
CN    1580501 A    2/2005
(Continued)

OTHER PUBLICATIONS

CN Office Action dated Jul. 11, 2016, for CN application No. 201480033879.8.
(Continued)

*Primary Examiner* — Charles A Fox
*Assistant Examiner* — Ryan P Dodd
(74) *Attorney, Agent, or Firm* — Beusse Wolter Sanks & Maire

(57) ABSTRACT

A method and an associated arrangement for coupling a rotational device, particularly a steam turbine, and a shaft device, particularly a gas turbine, includes the following steps: 1) accelerating the rotational device up to an output rotational speed that is below the rotational speed of the shaft device; 2) detecting a differential angle between the shaft device and the rotational device; and 3) accelerating the rotational device with an acceleration value that is derived from the target rotational speed difference, which is formed as a function of the detected differential angle, the acceleration and a desired target coupling angle.

17 Claims, 4 Drawing Sheets

(51) Int. Cl.
*F01D 19/00* (2006.01)
*F16D 48/00* (2006.01)
*F02C 7/26* (2006.01)
*F02C 6/18* (2006.01)

(52) U.S. Cl.
CPC ............ *F02C 6/18* (2013.01); *F05D 2220/72* (2013.01); *F05D 2250/311* (2013.01); *F05D 2260/40* (2013.01); *F05D 2260/4023* (2013.01); *F05D 2270/023* (2013.01); *F05D 2270/304* (2013.01); *F16D 2300/22* (2013.01); *F16D 2500/30816* (2013.01); *F16D 2500/30818* (2013.01); *F16D 2500/30825* (2013.01); *Y02E 20/16* (2013.01)

(56) References Cited

U.S. PATENT DOCUMENTS

| | | | |
|---|---|---|---|
| 6,024,674 A | 2/2000 | Sato et al. | |
| 6,481,554 B1 * | 11/2002 | Ota | F16D 48/064 192/103 R |
| 6,810,669 B2 * | 11/2004 | Tanaka | F01K 23/16 60/711 |
| 7,010,922 B2 | 3/2006 | Takai et al. | |
| 7,013,632 B2 | 3/2006 | Takai et al. | |
| 8,137,240 B2 | 3/2012 | Humer et al. | |
| 9,752,509 B2 * | 9/2017 | Clayton | F02C 7/36 |
| 2004/0011040 A1 | 1/2004 | Tanaka et al. | |
| 2004/0055272 A1 | 3/2004 | Tanaka | |
| 2009/0325765 A1 * | 12/2009 | Humer | F01K 23/101 477/180 |
| 2011/0010128 A1 * | 1/2011 | Hempl | G01D 5/244 702/151 |
| 2017/0175590 A1 * | 6/2017 | Bennauer | F01K 23/10 |

FOREIGN PATENT DOCUMENTS

| | | |
|---|---|---|
| CN | 101523017 A | 9/2009 |
| EP | 1503047 A1 | 2/2005 |
| EP | 1911939 A1 | 4/2008 |
| JP | H03153927 A | 7/1991 |
| JP | H10159872 A | 6/1998 |
| JP | H10184317 A | 7/1998 |
| JP | 2003013709 A | 1/2003 |
| JP | 2005054583 A | 3/2005 |
| JP | 2006063975 A | 3/2006 |
| JP | 2010506113 A | 2/2010 |
| JP | 2013007388 A | 1/2013 |
| RU | 2427720 C2 | 8/2011 |
| SU | 483337 A1 | 9/1975 |

OTHER PUBLICATIONS

RU grant decision dated Apr. 24, 2017, for RU patent application No. 2016100975.

JP Office Action dated Jan. 16, 2017, for JP patent application No. 2016-518943.

* cited by examiner

METHOD FOR COUPLING A STEAM TURBINE AND A GAS TURBINE AT A DESIRED DIFFERENTIAL ANGLE

CROSS REFERENCE TO RELATED APPLICATIONS

This application is the US National Stage of International Application No. PCT/EP2014/061794 filed Jun. 6, 2014, and claims the benefit thereof. The International Application claims the benefit of European Application No. EP13171947 filed Jun. 14, 2013. All of the applications are incorporated by reference herein in their entirety.

FIELD OF INVENTION

In combined gas and steam power plants, the gas turbine is initially driven by combusting gas. Steam for a steam turbine is produced using the exhaust heat of the gas turbine. Thus, when the gas and steam power plant is put into operation, the gas turbine is operated first. The steam turbine can only be switched on when sufficient steam is provided. In the case of single shaft installations, the gas turbine and generator are fixedly connected along a shaft. The steam turbine is arranged along the same axis and can be connected by way of a coupling. It is therefore necessary to couple the steam turbine and gas turbine.

BACKGROUND OF INVENTION

In practice, the coupling angle emerges randomly. From EP 1 911 939 A1, it is known to select the coupling angle in a targeted manner. Using this, it is possible to select a coupling angle at which the vibration load is minimized. Roughly speaking, this renders it possible to compensate imbalances of the two turbines to a certain extent. This can obtain a reduction in the vibration load, particularly in comparison with a coupling in which the two turbines are coupled in such a way that imbalances add. Despite this advantage, this method is not employed.

SUMMARY OF INVENTION

It is an object of the invention to provide an improved method for coupling with a desired coupling angle. Likewise, a corresponding arrangement is intended to be developed.

Even though the invention presented below is suitable, in principle, for coupling very different rotational devices with very different shaft devices, in the interest of a visual illustration it is always a steam turbine that is selected as an example for a rotational device and a gas turbine that is selected as an example for a shaft device. From the current point of view, this is the most important application of the invention. However, further applications are expressly conceivable.

What was identified is that a method for coupling a steam turbine and a gas turbine by means of the following steps is to be specified. Initially, the steam turbine should be accelerated up to an initial rotational speed lying below the rotational speed of the gas turbine. To this end, a usual procedure can be used and the steam turbine can be started up when there is a sufficient amount of steam. The object here is to detect a differential angle between the gas turbine and the steam turbine. When the initial rotational speed is reached, the acceleration of the steam turbine is continued with an acceleration value selected depending on the rotational speed difference and the differential angle. As soon as the rotational speed difference between the steam turbine and gas turbine has dropped to a value of zero, the steam turbine is coupled in, wherein the steam turbine simultaneously continues to be accelerated. That is to say, the rotational speed of the steam turbine equals the rotational speed of the gas turbine at the start of the coupling procedure. The steam turbine is accelerated in relation to the gas turbine such that the steam turbine rotational speed briefly exceeds the rotational speed of the gas turbine.

Depending on a predetermined target angle and the steam turbine acceleration up to the initial rotational speed, the steam turbine rotational speed setpoint value to be selected in actual fact is set depending on the angle difference and rotational speed difference. Here, the discovery that there is a unique relationship between the differential angle at the initial rotational speed, the acceleration value with which the steam turbine is accelerated from the initial rotational speed to a setpoint rotational speed relative to the gas turbine, and the emerging coupling angle—the target coupling angle in the present case—is employed. The difference between the setpoint rotational speed and the rotational speed of the gas turbine is denoted the setpoint rotational speed difference. The setpoint rotational speed of the steam turbine varies in time and is formed depending on the rotational speed difference and angle difference. The rotational speed of the steam turbine rotational speed increases slightly over the rotational speed of the gas turbine during the coupling. Naturally, the rotational speeds of the gas turbine and steam turbine are equal after the coupling has been completed.

The differential angle at the initial rotational speed, abbreviated to start differential angle, emerges randomly and is known from the differential angle measurement. Computationally, the start differential angle is selected from a region comprising 360° around a so-called nominal start differential angle in this case. The nominal start differential angle is the angle by means of which the gas turbine would be ahead of the steam turbine up to coupling in the case where the steam turbine acceleration is maintained unchanged, taking into account the target angle. This is intended to be illustrated using an example: if the start differential speed is −1 Hz, the previous steam turbine acceleration is 0.05 Hz/s and the target value is 0°, then the nominal start differential angle is 3600°.

The target coupling angle is normally selected in such a way that a minimization of a vibration load of the coupled gas turbine and steam turbine is achieved. The target coupling angle in particular to be targeted can in this case be established by measuring the vibration load and by calculation-based observations. In general, a combination of both will be used.

There are—albeit restricted—degrees of freedom when selecting the initial rotational speed difference and when selecting the acceleration value. What needs to be considered when selecting the acceleration value is that sufficient steam is available and that no instabilities or the like occur.

It was found to be expedient if the initial rotational speed difference is approximately 0.5 Hz to approximately 1 Hz, wherein the rotational speed of the steam turbine is less than the rotational speed of the gas turbine.

A substantial advantage of the present method over the method applied in EP 1 911 939 A1 is that there is no need for an interruption of the acceleration process at a holding rotational speed. As a result, it is possible to couple quickly and at the same time obtain a desired target coupling angle.

It should also be noted that the steam turbine is ahead of the gas turbine by several full revolutions in relation to the target angle during the acceleration of the steam turbine from the initial rotational speed up to the rotational speed at which the speed of the steam turbine has reached that of the gas turbine. In relation to the change of the differential angle, the number of full revolutions by which the steam turbine is ahead is clearly irrelevant. Changing the number of these full revolutions provides a further degree of freedom such that different initial rotational speed differences are possible for reaching the desired target coupling angle in the case of a given acceleration or that different acceleration values come into question in the case of a given initial rotational speed difference.

In one embodiment, the desired initial rotational speed difference is selected from a rotational speed difference range such that the value with which the acceleration of the steam turbine to the initial rotational speed took place is selected when the desired acceleration value is set from the setpoint rotational speed difference. What this can achieve is that the acceleration value needs to be changed as little as possible, or not at all in the ideal case, for obtaining the target value.

In one embodiment, provision is made for the initial rotational speed to lie approximately 1 Hz below the rotational speed of the gas turbine, in particular approximately 0.5 Hz to approximately 1.5 Hz and further particularly approximately 0.5 Hz and approximately 1.1 Hz therebelow. These values were found to be suitable.

In a further embodiment, provision is made for the acceleration value to be approximately 0.025 Hz/s to approximately 0.075 Hz/s, in particular approximately 0.05 Hz/s.

Normally, it should be noted that the differential angle is modified by a coupling twist angle during coupling. Generally, this is due to the steam turbine initially being accelerated to the setpoint rotational speed, i.e. a rotational speed slightly above the rotational speed of the gas turbine. Due to the turning into a coupling sleeve that follows this overtaking procedure, there can be backing by the coupling twist angle. Ultimately, the vibration load can be further optimized by taking into account the coupling twist angle.

The invention also relates to a corresponding arrangement comprising a gas turbine and a steam turbine, with a coupling for coupling the gas turbine and steam turbine. This arrangement has a device for detecting the differential angle between the gas turbine and the steam turbine. Furthermore, a device for accelerating the steam turbine by an acceleration value is present. Furthermore, means are arranged, which means render it possible to obtain a desired target coupling angle between the gas turbine and steam turbine as a function of the detected differential angle by matching an acceleration value, by means of which the steam turbine is accelerated, and a setpoint rotational speed difference between the gas turbine and steam turbine, at which a coupling procedure starts.

This arrangement is suitable for carrying out the method described above. The various embodiments of the method can be realized by embodiments of the arrangement.

What should be presented here is that—at best—all that is required are minor structural modifications of a known gas turbine installation, which comprises a waste heat steam generator which provides steam for driving a steam turbine. Thus, means for accelerating the steam turbine are always present. Specifically, this relates, inter alia, to valves which are intended to lead the steam to the steam turbine, and to the associated actuation of the valves. It is also conventional to determine the phase angle of turbines. Therefore, corresponding measurement devices are normally present. However, the phase angle is often not detected quickly enough in known installations. Thus, retrofitting will be required in order to detect the relative angle quickly enough and to provide the detected value to the controller. To this end, clocking from approximately 4 ms to approximately 20 ms is normally expedient. In general, beyond this, it is only the control devices that are to be modified in relation to the prior art.

BRIEF DESCRIPTION OF THE DRAWINGS

Below, the invention will be described in more detail on the basis of figures. Here.

DETAILED DESCRIPTION OF INVENTION

Figure 1:
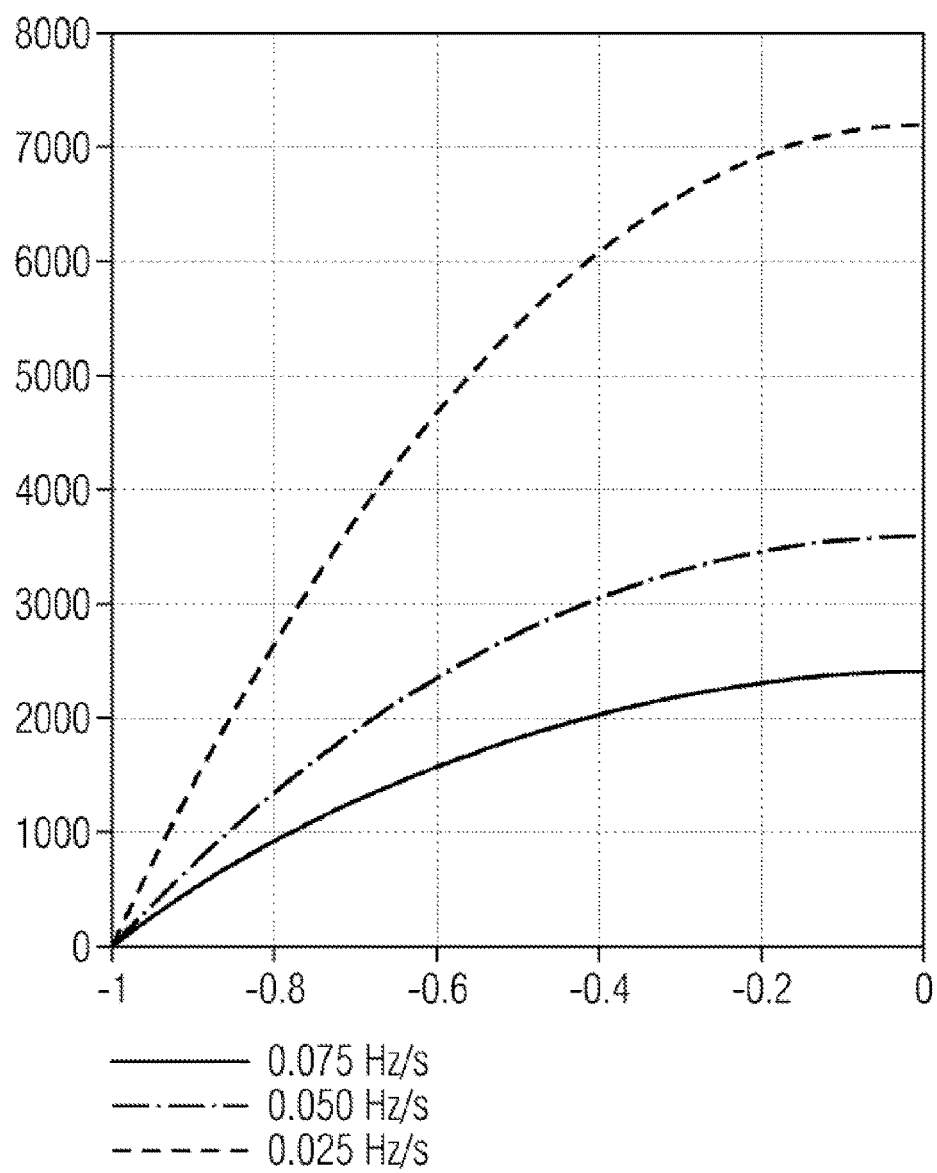
FIG. 1 shows the relationship between various coupling angles in the case of different relative accelerations proceeding from an initial rotational speed difference of 1 Hz and an initial angle difference of zero.

FIG. 1 shows the differential angle during the acceleration of the steam turbine as a function of the respective rotational speed difference for various constant acceleration values. The rotational speed difference between gas turbine and steam turbine in hertz is plotted along the X-axis. The differential angle in degrees is plotted along the Y-axis, wherein the integer multiples of 360° are also added.

The uppermost dashed curve shows the relationship in the case of an acceleration value of 0.025 Hz/s, the central dotted curve shows the relationship in the case of an acceleration value of 0.05 Hz/s and the lower full line shows the relationship in the case of an acceleration value of 0.075 Hz/s. This is intended to be explained in more detail on the basis of the central curve.

The point at the left-hand, lower end of the curve is considered to be the initial point. The angle difference between the gas and steam turbine is zero; the rotational speed difference is −1 Hz. That is to say, the gas turbine rotates with one Hz more than the steam turbine. At this point, i.e. at this initial rotational speed difference of the steam turbine, the targeted approach of a coupling angle is intended to start.

The steam turbine is accelerated with an unchanging acceleration of 0.05 Hz/s relative to the gas turbine until both turbines have the same rotational speed. The gas turbine, which is quicker up until that point, passes over an angle that is greater than that of the steam turbine by 3600° up to the point in time at which the steam turbine has the same speed; that is to say, said gas turbine has experienced 10 more revolutions than the steam turbine in the time period. Reference is made to the fact that the time axis is not depicted here. What can be identified from the curve is that the differential angle change between gas and steam turbine reduces as the speeds approach, i.e. the smaller the rotational speed difference is. What can furthermore be seen from the different curves is that the passed-over angle up to the coupling start is larger the smaller the acceleration is. This effect is used essentially for actuating a selected target coupling angle.

Quantitatively different relationships apply for different acceleration values and different start differential angles; however, the deliberations are otherwise analogous. By way of example, the target coupling angle for the start of coupling is 0° in the case of a start differential angle of −3600° and a relative acceleration of 0.05 Hz.

Figure 2:
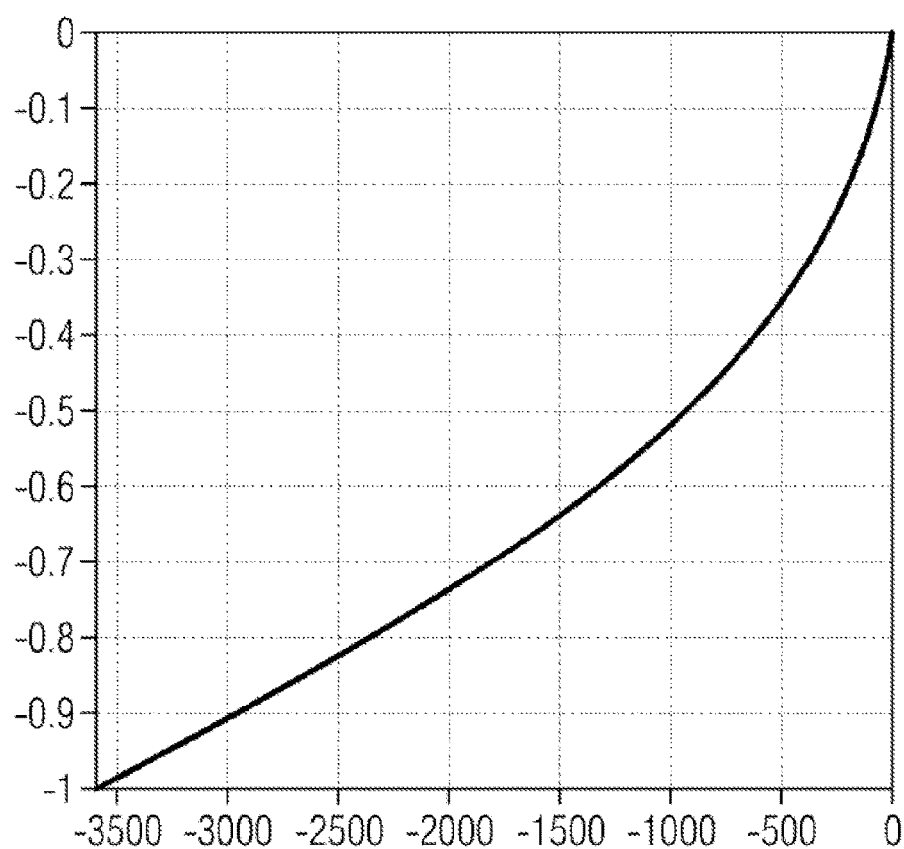
FIG. 2 shows the setpoint rotational speed difference as a function of the differential angle, proceeding from an initial rotational speed difference of 1 Hz and an initial angle difference of −3600°.

FIG. 2 is an inverse illustration of FIG. 1, with only the curve with an acceleration value of 0.05 Hz/s being depicted here. Here, compared to FIG. 1, the start differential angle was set to −3600° in order to nominally achieve a target coupling angle of 0°. Plotted on the X-axis is the differential angle in degrees, wherein the integer multiples of 360° are also added. The Y-axis plots the rotational speed difference between gas turbine and steam turbine in Hz.

FIG. 2 therefore highlights how the rotational speed difference depends on the differential angle in the case of a constant relative acceleration of 0.05 Hz/s. Here, a differential angle of 0° is assumed in the case of a corresponding frequency between gas turbine and steam turbine. For a selected acceleration of 0.05 Hz/s, FIG. 2 represents the central setpoint value curve. Thus, for example, the speed difference between gas turbine and steam turbine should be −0.5 Hz in the case of an angle difference of 900°. That is to say that the steam turbine still is slower than the gas turbine by 0.5 Hz in the case of an angle difference of 900°.

In an ideal case, FIG. 2 describes the relationship between passed-over angle and rotational speed difference between the steam turbine and gas turbine.

If the speed difference in the case of a measured differential angle of −900° is larger in the real installation, it is not the target angle of 0°, but rather a larger target angle, that is reached when there is an unchanging acceleration of 0.05 Hz/s. In this case, the steam turbine is too slow; it must be accelerated more strongly.

Conversely, if the speed difference is smaller in the case of a measured differential angle of −900° in the real installation, it is not the target angle of 0°, but rather a smaller target angle, that is reached when there is an unchanging acceleration of 0.05 Hz/s. In this case, the steam turbine is too quick; it must be decelerated.

Figure 3:
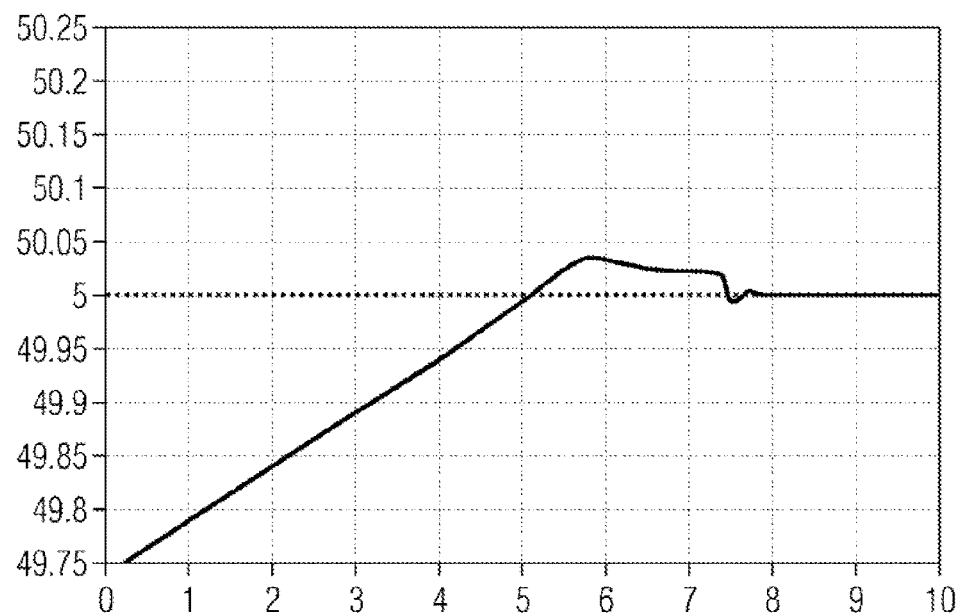
FIG. 3 shows the profile of the rotational speed of the gas turbine and the steam turbine in an exemplary manner.

The coupling procedure as such is depicted in FIG. 3. The time in seconds is plotted along the X-axis and the rotational speed is plotted along the Y-axis. Initially, the steam turbine is slower than the gas turbine but it is accelerated relative to the latter. The rotational speed of the gas turbine is constant at 50 Hz, as depicted by the dotted line. The speed of the steam turbine is plotted by means of the full line. The coupling procedure starts at the time at which the steam turbine has the same speed as the gas turbine. Thus, a start is made to enter the coupling. Initially, the steam turbine is accelerated further; it overtakes the gas turbine in the process and runs into the stop of the coupling. There is a deceleration at this position. Afterwards, the two turbine shafts rotate with the same rotational speed.

Figure 4:
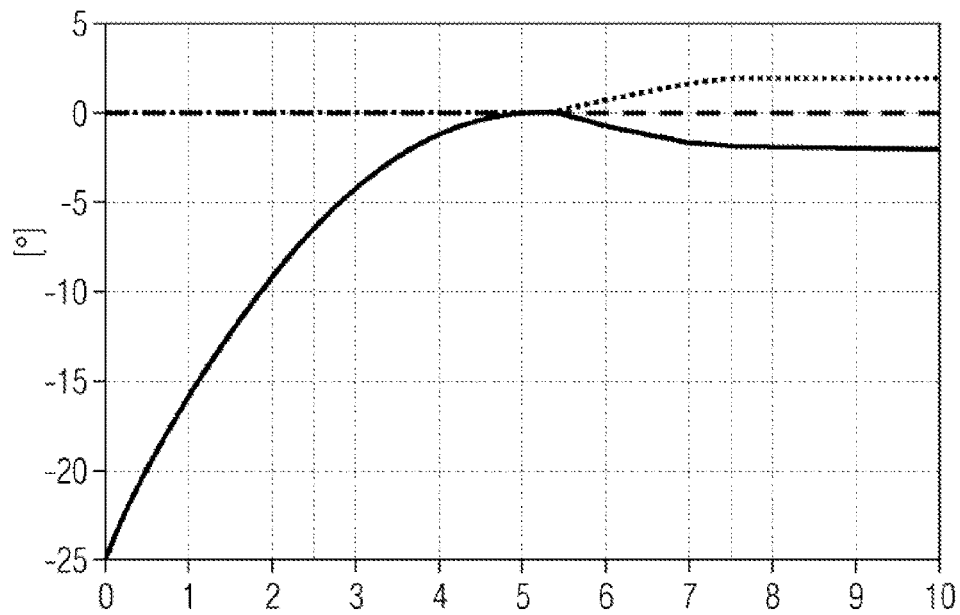
FIG. 4 shows the profile of the differential angle during coupling and the coupling twist angle.

The effect of the coupling on the differential angle becomes apparent from FIG. 4. The X-axis once again plots the time in seconds and the Y-axis plots the rotational angle difference in degrees. The dashed line shows a setpoint value of the angle difference, which is at 0° in this case. The full line, initially extending below, highlights the time profile of the actual angle difference. Initially, the rotational angle of the steam turbine is 250° smaller than the rotational angle of the gas turbine. This rotational angle difference initially decreases quickly to a difference of zero degrees. Then, the rotational angle difference increases again, by approximately 20° in the present case. This is due to the fact that there is a backing of the steam turbine by the coupling twist angle when turning into the coupling sleeve. The profile of the coupling twist angle can be identified by the dotted line.

Thus, what should be taken into account when selecting the desired target coupling angle during coupling is that there is a change in the rotational angle difference by the coupling twist angle during coupling-in.

Figure 5:
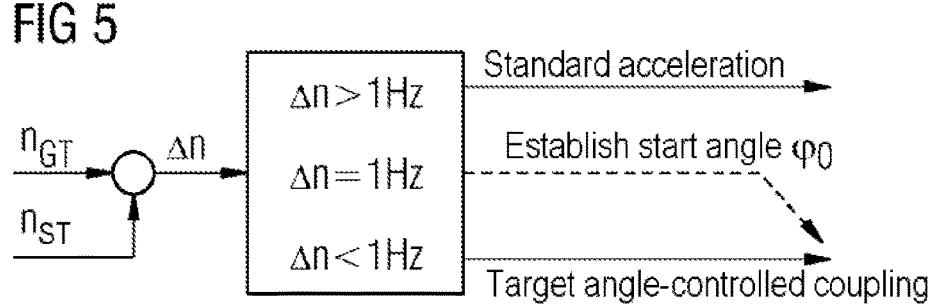
FIGS. 5, 6 and 7 show the principle of coupling with a desired differential angle.
Figure 6:
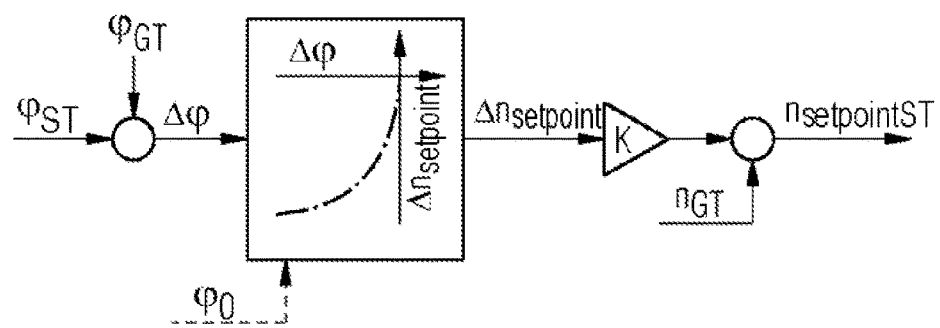
Figure 7:
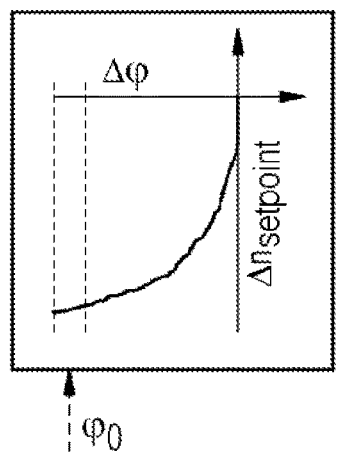

FIGS. 5, 6 and 7 schematically show the closed-loop control for carrying out the above-described method.

FIG. 5 provides an overview of the whole process of starting up the steam turbine. The steam turbine is accelerated as per usual by way of a predetermined ramp up to a predetermined speed difference (1 Hz was selected here). In the case of a speed difference of 1 Hz, i.e. the initial rotational speed, there is a switchover to the target angle-regulated coupling. To this end, the current angle difference is detected in the range 0°-360° and reduced by the angle range which the gas turbine would pass over up to the start of the coupling when the previous acceleration of the steam turbine is maintained. This should be clarified using an example: the rotational speed difference between the gas turbine and steam turbine is 1 Hz; the steam turbine is accelerated by 0.05 Hz/s. 20 seconds pass up until the time at which the gas turbine and the steam turbine have the same speed. The differential angle passed over in the process is 3600°.

FIG. 6 describes the actual closed-loop control of the target coupling angle. The difference between the steam turbine twist angle and gas turbine twist angle, i.e. the differential angle, is transferred into a setpoint rotational speed difference between the steam and gas turbine by means of a characteristic. The setpoint rotational speed of the steam turbine is thus set depending on the gas turbine rotational speed and the differential angle. The factor "K" in this case provides the additional possibility for further increasing this setpoint rotational speed difference. Here, the factor "K" is the feedback factor of the system deviation, i.e. the deviation of the actual value from the setpoint value. Therefore, this is a P-controller. It should be analyzed and set separately in view of the properties of the resultant overall control loop. The standard prescription is K=1. The setpoint rotational speed of the steam turbine emerges by adding the gas turbine rotational speed.

The use of an "adjustable offset" renders it possible to design the whole computational prescription to a target angle of zero. A desired target angle deviating from zero is displaced by way of this offset in such a way that a standard curve is usable for the relationship between $\Delta\varphi$ and $\Delta n_{setpoint}$. Using this approach, it is then possible to restrict the considerations to a desired target angle of 0°.

FIG. 7 illustrates the influence and the selection of the start angle $\varphi_0$. The actual measurement initially supplies a value from the range between 0° and 360°. This is explained in more detail below.

In the case of an acceleration of the steam turbine relative to the gas turbine with a constant acceleration of k Hz/s, a time $t=\Delta\omega_0/k$ is required to overcome an initial rotational speed difference of $\Delta\omega_0$. During this time, the system passes over a relative angle difference corresponding to $(\Delta\omega_0)^2/(2*k)$ whole revolutions. Thus, if the differential angle at the start rotational speed difference $\Delta\omega_0$ randomly happened to be $-360°*(\Delta\omega_0)^2/(2*k)$, the constant acceleration k will be suitable to target the target angle 0°. In the case of every other start angle difference, the acceleration needs to be modified in order to arrive at the target angle of 0°. If the start angle is now set to $-360°*(\Delta\omega_0)^2/(2*k)$+measured angle, this means that the turbine must experience a slightly increased acceleration relative to the acceleration k up to the initial rotational speed. A slight increase in the acceleration during the controlled approach of the target coupling angle was found to be more advantageous than a slight reduction in the acceleration. The selected approach of setting the differential angle at the start rotational speed difference as above always renders it possible to slightly increase the acceleration. Using a numerical example: it is better to assume that the steam turbine must advance by 270° rather than be intended to fall back by 90°.

Even though the invention was, in detail, described and illustrated more closely on the basis of the preferred exemplary embodiment, the invention is not restricted by the disclosed examples and other variations can be derived therefrom by a person skilled in the art, without departing from the scope of protection of the invention.

The invention claimed is:

1. A method for coupling a rotational device and a shaft device comprising:
    accelerating the rotational device at an initial acceleration value up to an initial rotational speed which lies below a rotational speed of the shaft device;
    detecting a differential angle between the shaft device and the rotational device upon reaching the initial rotational speed;
    selecting a setpoint rotational speed difference which is a difference between a setpoint rotational speed of the rotational device and a rotational speed of the shaft device when the coupling is to initiate;
    accelerating the rotational device to the setpoint rotational speed with a second acceleration value, wherein the second acceleration value is formed depending on the detected differential angle, a rotational speed difference between the initial rotational speed and the setpoint rotational speed, and a desired target coupling angle.

2. The method as claimed in claim 1, wherein the initial acceleration value is selected as the second acceleration value.

3. The method as claimed in claim 1, wherein the initial rotational speed lies approximately 1 Hz below the rotational speed of the shaft device.

4. The method as claimed in claim 1, wherein the second acceleration value is approximately 0.025 Hz/s to approximately 0.075 Hz/s.

5. The method as claimed in claim 1, wherein the fact that the differential angle is modified by a coupling twist angle during coupling is noted when setting the second acceleration value from the setpoint rotational speed difference.

6. An arrangement comprising
    a shaft device,
    a rotational device,
    a coupling for coupling the shaft device and the rotational device,
    a detection device for detecting a differential angle between the shaft device and the rotational device;
    an accelerating device for accelerating the rotational device by an acceleration value; and
    a controller adapted to:
        accelerate the rotational device at an initial acceleration value up to an initial rotational speed which lies below a rotational speed of the shaft device;
        detect the differential angle at the initial rotational speed;
        select a setpoint rotational speed difference, which is a difference between a setpoint rotational speed of the rotational device and a rotational speed of the shaft device when the coupling is to initiate; and
        achieve a desired target coupling angle between the shaft device and the rotational device by accelerating the rotational device to the setpoint rotational speed with a second acceleration value formed as a function of the detected differential angle, a rotational speed difference between the initial rotational speed and the setpoint rotational speed, and the desired target coupling angle.

7. The arrangement as claimed in claim 6, wherein the detection of the differential angle can be determined with clocking of approximately 4 ms to approximately 20 ms or less.

8. The method of claim 1, wherein the rotational device comprises a steam turbine, and the shaft device comprises a gas turbine.

9. The method as claimed in claim 1, wherein the initial rotational speed lies approximately 0.5 Hz to approximately 1.5 Hz below the rotational speed of the shaft device.

10. The method as claimed in claim 1, wherein the initial rotational speed lies approximately 0.9 Hz and approximately 1.1 Hz below the rotational speed of the shaft device.

11. The method as claimed in claim 1, wherein the second acceleration value is approximately 0.05 Hz/s.

12. The arrangement as claimed in claim 6, wherein the rotational device comprises a steam turbine, and the shaft device comprises a gas turbine.

13. The method as claimed in claim 1, wherein the setpoint rotational speed of the rotational device is greater than the rotational speed of the shaft device.

14. The method of claim 1, wherein the second acceleration value is formed depending further on the initial acceleration value, and wherein the second acceleration value is different from the initial acceleration value.

15. The method of claim 14, wherein the second acceleration value is greater than the initial acceleration value.

16. The arrangement of claim 6, wherein the second acceleration value is formed depending further on the initial acceleration value, and wherein the initial acceleration value and the second acceleration value are different from each other.

17. The arrangement of claim 16, wherein the second acceleration value is greater than the initial acceleration value.

* * * * *